Patented May 28, 1946

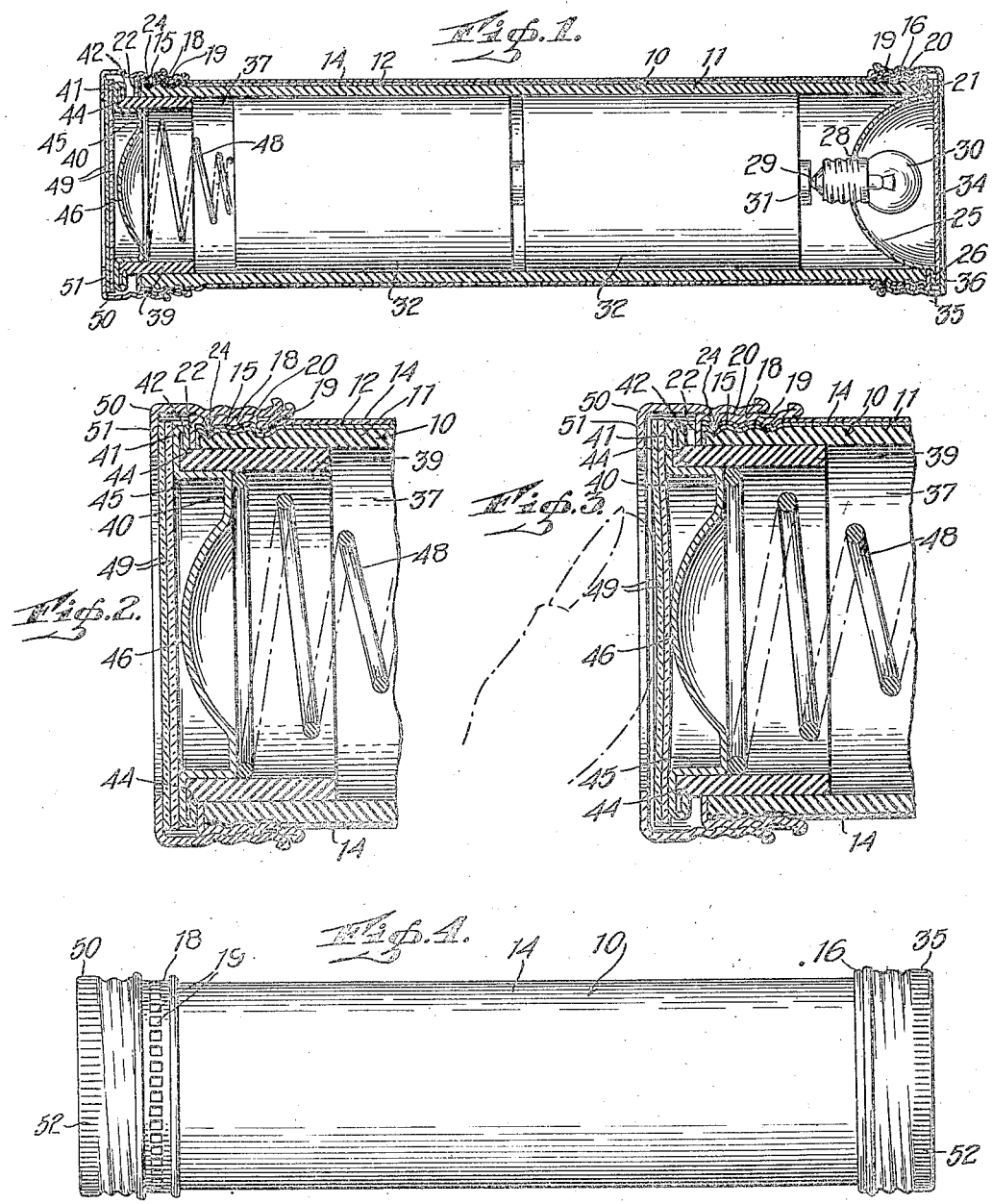

2,401,014

UNITED STATES PATENT OFFICE 2,401,014

FLASHLIGHT

Wanda L. Paul, New York, N. Y.

Application June 3, 1943, Serial No. 489,455

6 Claims. (Cl. 200—60)

This invention relates to flash lights and to means and methods for forming flash light shells and more particularly to apparatus and devices utilizing low priced materials in flash light barrels and switches.

Objects of the invention are to provide an improved device or apparatus of this kind which employs a sliding switch member in the rear of the barrel to maintain alinement of the rear contact spring with cells within the barrel, making for easy assembly of the flash light and insertion of new cells; and to provide improved means for establishing electrical connections between front and rear ends of the barrel. Other objects of the invention are to provide an improved flashlight of this kind in which insulating disks used for the switch are interchangeable with head light lenses to obtain lighting of different colors, and to provide a flash light shell substantially alike at both ends thereof to reduce the number of parts required for its construction.

Additional objects of the invention are to effect simplicity and efficiency in such methods and apparatus and to provide a simple device or apparatus of this kind which is economical, durable, and reliable in operation.

The inventive features for the accomplishment of these and other objects are shown herein in connection with a flash-light which briefly stated, includes a tube having a strip of metallized paper extending from one end to the other thereof disposed against the outer face thereof. Rings are mounted on each end of the tube and pricked to form barbs in contact with the strip. A switch means slidably received in the rear of the barrel selectively completes a circuit through lamp and cells within the flash-light.

In the accompanying drawing showing, by way of example, one of many possible embodiments of the invention, Fig. 1 is a longitudinal sectional view of the flash-light showing the switch in "off" position;

Fig. 2 is an exaggerated fragmentary sectional view of the rear end of the flash-light showing the switch in "on" position for continuous lighting;

Fig. 3 is a view similar to that shown in Fig. 2 but showing the action of the switch for manually controlled intermittent lighting; and Fig. 4 is a side elevation of the flash-light.

The flash-light comprises a barrel generally designated as 10 comprised of a tube 11 of stiff paper, fiber or other suitable insulating material which may or may not be subject to shrinkage on which is disposed a strip 12 of metallized paper, metal, metal foil, or other suitable electrical conductor material against the outer face of the tube and extending to each end thereof. A thin casing 14 of insulating material such as paper, cloth, plastic or the like is secured around the outer face of the tube and strip to protect the latter, but is terminated short of the ends of the strip to provide exposed surfaces 15 thereof.

Forward and rear thin metallic rings 16, 18 are secured on each end portion of the tube to slightly overlap the casing as by crimping at 19, each of the rings being provided with external threads 20 at their outer ends, preferably formed by stamping, and embedded in the casing and tube. Inturned flanges 21, 22 of the rings are developed substantially over the respective end faces of the tube to provide contact faces the function of which is described later. The rings are in electrical contact with the strip at the exposed surfaces augmented by means of barbs or prongs 24 formed by indenting or pricking the threaded portion with a pointed tool after the rings are secured on the tube and casing. The barbs penetrate and engage the strip and project into the wall of the tube.

A metallic reflector 25 in the forward end of the tube is provided with an outstanding flange 26 over the forward end face of the barrel. The apex portion of the reflector is provided with threads 28 to hold the central contact 29 of a lamp 30 against the central terminal 31 of the forwardmost cell of the battery 32. A lens 34 or flat transparent disk of glass or plastic is disposed over said reflector the marginal portion of the lens engaging against reflector flange. A forward annular cap 35 having an internal flange 36 is threaded onto the forward ring for retaining the lens and reflector as disposed, the internal flange engaging against the marginal portion of the lens and the aperture of the cap annulus permitting the light to shine outwardly.

An inner sleeve or guide 39 of paper, fiber or other suitable insulating material slidably received within a space 37 in the rear end portion of the tube behind the battery 32 functions as a suitable switch mounting means. For one of the switch contacts a metallic cover 40 is secured over the outer end face of the sleeve and provided with an outstanding flange 41 turned forwardly substantially against itself as at 42 and provided with prongs 44 projecting from the turned portion into the sleeve. The flange is adapted to engage or contact the internal flange 22 serving as the other contact of the switch. The peripheral portions of the cover are recessed as at 45 to engage the inner wall of the sleeve and the intramarginal portion may be bulged rearwardly to form a push button 46. An electrically conducting compressible spring 48 is disposed in contact with the cover and adapted to bear against the bottom of the rearmost cell of the battery 32 for contact therewith and to urge the cover from contact with the rear ring 18. The spring is preferably conically shaped with a base coil normally of greater diameter than the inside diameter of the sleeve so that the spring is frictionally held therein.

One or more disks or lenses 49 of hard or flexible plastic, glass, paper or other suitable insulating material are disposed over the rear end face of the cover. The disks are preferably of the same diameter as, and interchangeable with, the lens 34 so that disks of different color may be used singly or in combination as a lens to vary the color of the light emitted. If convex lenses are used the bulged portion 46 of the switch cover may be omitted or somewhat flattened as in Fig. 1 and the thick portion of the lens received in the recessed cover. A rear annular cap 50 provided with an internal flange 51 is threaded onto the rear ring for holding the cover and disk associated with the tube, the disk preventing contact between the cap 51 and the cover 40. To complete a circuit through the bulb and cells, the cover may be held in contact with the rear ring flange by tightly screwing the cap 50 on to the rear ring for continuous use or by pressing on the disks manually for intermittent lighting as shown in Fig. 3. The front and rear caps may be knurled as at 52 to facilitate rotation thereof.

As hereinbefore mentioned the paper or other material of the tube and casing may be subject to shrinking or swelling as a result of climatic changes so that the contact between the rings and the strip 12 may become loosened. While the barbs or prongs 24 tend to reduce this looseness to a minimum, there is a certain amount of unavoidable looseness between the rings and the tube. It has been found that tightly screwing on the caps causes the connection to be restored more or less permanently, probably due to a wiping action of the prongs 24 against the strip. It will be noted that the rings 16, 18 and caps 35, 50 for each end of the tube may be, and are, identical.

The inner sleeve 39 by engaging the inner walls of the tube maintains the flange substantially perpendicular to the axis of the tube so that the flange cannot wabble and cause accidental contact with the rear ring. The length of the sleeve is therefore preferably equal to about half the diameter of the tube. The lengths of the space 37 and of the expanded spring are preferably so related to the sleeve length that the sleeve may be partially inserted in the space 37 of the tube without compressing the spring so that the cover and spring will not become canted when the cap 50 is applied thereby facilitating assembly.

The invention claimed is:

1. A switch means for flash-light having in combination a tube having a rear end face of conductive material; a guide of insulating material slidably received within the rear end portion of the tube and loosely engaging the inner walls thereof; a metallic cover secured over the outer end face of the guide and provided with an outstanding flange turned forwardly against itself and provided with prongs projecting from the turned portion into the guide, the flange being adapted to engage said end face of the tube when the guide is moved forwardly, and means for retaining the guide within the tube, said guide maintaining the flange in a plane substantially perpendicular to the axis of the tube.

2. A flash light having in combination a tube adapted to receive therein a cell and having a rear end face of conductive material; a guiding sleeve of insulating material slidably fitted within the rear end portion of the tube and slidably engaging the inner wall thereof; a metallic cover secured over the outer end face of the sleeve and provided with an outstanding flange adapted to engage said end face of the tube when the sleeve is moved forwardly; an insulating disk resting on the periphery of the cover; the cover being inwardly recessed within the sleeve to form a cylindrical portion pressed against the inner face thereof to strengthen the connection between the cover and the sleeve and provided with a shoulder facing the cell; a conical shaped spiral metallic compression spring having its base coil fitting within said guiding sleeve against said shoulder and adapted to press against the cell; a ring secured on the end portion of the tube out of contact with the tube and having an inturned flange developed over the periphery of the insulating disk on the cover; whereby the disk insulates the cover from said ring and whereby pressure on the disk will be communicated to the metallic cover and force said flange into engagement with said conductive rear end face of the tube.

3. A flash light having in combination a tube adapted to receive therein a cell and having a rear end face of conductive material; a guiding sleeve of insulating material slidably fitted within the rear end of the tube; a metallic cover secured over the outer end face of the sleeve and provided with an outstanding flange adapted to be moved forwardly to engage said end face of the tube; a disk resting on the periphery of the cover; the cover being inwardly pressed to form a cylindrical portion pressed against the inner face of the sleeve, and formed with a shoulder facing the cell; a spring fitted within the guiding sleeve against said shoulder and adapted to press on the cell; and means for holding the cover and sleeve assembled with the tube; said sleeve serving the multiple function of holding the spring and guiding the cover.

4. A flash light comprising a barrel having a rear end face of conductive material; a tubular guide of insulating material slidably received within the rear end portion of the barrel; a metallic cover secured over the outer end face of the guide and provided with an outstanding flange engaging the end face of the barrel; the cover being inwardly pressed to form a cylindrical portion disposed in the tubular guide against the inner face of the guide and holding the cover coaxial with the guide; said guide maintaining said flange in a plane substantially perpendicular to the axis of the barrel.

5. A flash light comprising a barrel having a rear end face of conductive material; a tubular guide of insulating material slidably received and guided within the rear end portion of the barrel; a metallic cover secured over the outer end face of the guide and provided with an outstanding flange engaging the end face of the barrel; the outer part of the flange being a portion forwardly and inwardly turned against itself and having holding engagement with the tubular guide; said guide maintaining said flange in a plane substantially perpendicular to the axis of the barrel.

6. A flash light comprising a barrel having a rear end face of conductive material; a tubular guide of insulating material slidably received and guided within the rear end portion of the barrel; a metallic cover secured over the outer end face of the guide and inwardly pressed to form a cylindrical portion disposed in the tubular guide against the inner face thereof; the cover being provided with an outstanding flange engaging the end face of the guide; the outer part of the flange being forwardly and inwardly turned and having holding engagement with the guide and clamping the guide between the inwardly turned part and said cylindrical portion.

WANDA L. PAUL.